United States Patent
Viswanathan et al.

(10) Patent No.: US 10,015,650 B2
(45) Date of Patent: Jul. 3, 2018

(54) DYNAMIC BRANDING BASED ON BASEBOARD MANAGEMENT CONTROLLER

(71) Applicant: DELL PRODUCTS, LP, Round Rock, TX (US)

(72) Inventors: Ganesh Kuppuswamy Viswanathan, Round Rock, TX (US); Pritesh Francis Prabhu, Georgetown, TX (US); Junyong Chau, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 15/263,071

(22) Filed: Sep. 12, 2016

(65) Prior Publication Data

US 2018/0077516 A1 Mar. 15, 2018

(51) Int. Cl.
*H04W 4/50* (2018.01)
*H04W 4/00* (2018.01)
*H04L 12/24* (2006.01)

(52) U.S. Cl.
CPC ........... *H04W 4/50* (2018.02); *H04L 41/0816* (2013.01); *H04W 4/001* (2013.01)

(58) Field of Classification Search
CPC .. H04N 21/4316; H04N 21/812; H04N 21/84; H04N 5/44591; H04N 21/4312; H04N 2005/91335; H04N 21/8153; H04N 21/8358; G06Q 30/0267; G06Q 30/02; G06Q 20/3821; H04W 4/18
See application file for complete search history.

(56) References Cited

U.S. PATENT DOCUMENTS

| | | | |
|---|---|---|---|
| 7,987,397 B2 | 7/2011 | Yang | |
| 8,320,838 B2 | 11/2012 | Lewallen | |
| 8,612,967 B1* | 12/2013 | Delker | ...................... G06F 8/61 717/169 |
| 2007/0207800 A1 | 9/2007 | Daley et al. | |
| 2009/0044185 A1 | 2/2009 | Krivopaltsev | |
| 2009/0228742 A1 | 9/2009 | Lewallen | |
| 2013/0303142 A1* | 11/2013 | Burcham | .............. H04W 4/008 455/418 |

* cited by examiner

*Primary Examiner* — Kwasi Karikari
(74) *Attorney, Agent, or Firm* — Larson Newman, LLP (57) ABSTRACT

A generic software application may be dynamically branded in response to communication with a baseband management controller. Servers and other information handling systems may be remotely or locally managed using the generic software application. The generic software application provides an interface to the baseboard management controller. The baseboard management controller locally stores one or more branding files associated with a brand identity. Once the communication is established, the baseboard management controller sends the branding files to a device executing the generic software application. The branding files may then be incorporated into the interface provided by the generic software application. The interface may thus assume the brand identity associated with the baseband management controller. When management of the baseband management controller is completed, the communication terminates and the branding files may be discarded. The interface provided by the generic software application may thus return to a debranded state.

19 Claims, 11 Drawing Sheets

DYNAMIC BRANDING BASED ON BASEBOARD MANAGEMENT CONTROLLER

FIELD OF THE DISCLOSURE

The present disclosure generally relates to information handling systems, and more particularly relates to dynamic branding of software applications.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A generic software application may be dynamically branded in response to communication with a baseband management controller. Servers and other information handling systems may be remotely or locally managed using the generic software application via the baseboard management controller. The generic software application may provide an interface to the baseboard management controller. The baseboard management controller locally stores one or more branding files associated with a brand identity. Once the communication is established, the baseboard management controller sends the branding files to a device executing the generic software application. The branding files may then be incorporated into the interface provided by the generic software application. The interface may thus assume the brand identity associated with the baseband management controller. When management of the baseband management controller is completed, the communication terminates and the branding files may be discarded. The interface provided by the generic software application may thus return to a debranded state that no longer reflects the brand identity associated with the baseband management controller.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
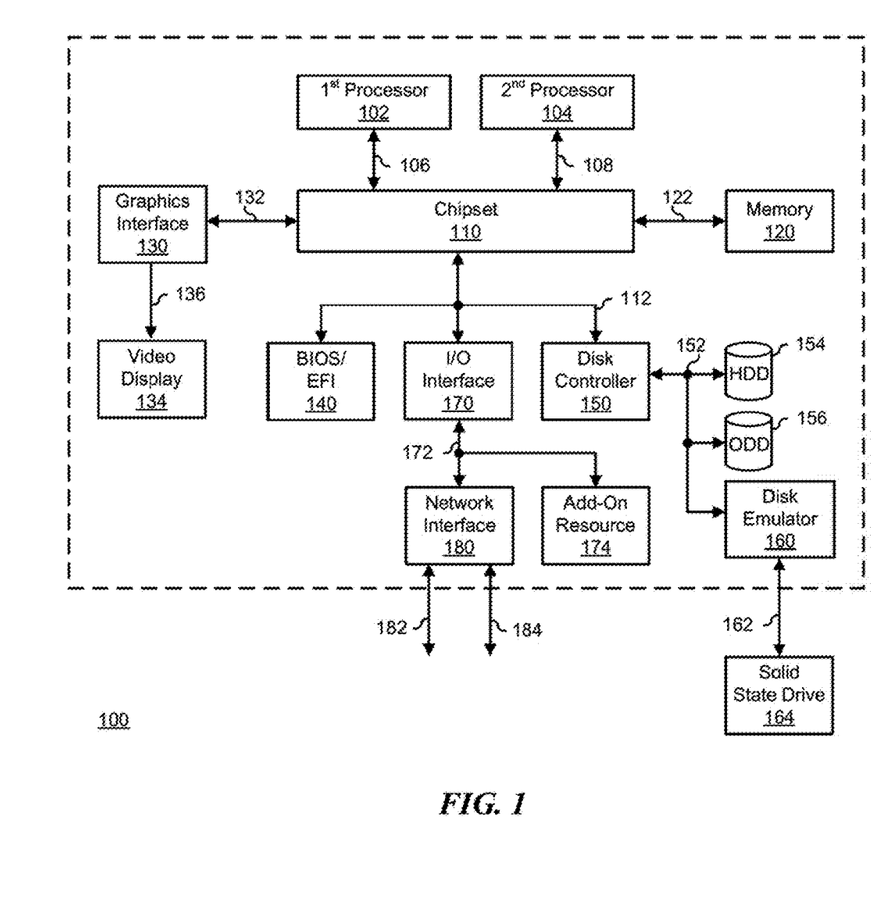
FIG. 1 is a block diagram illustrating an information handling system according to an embodiment of the present disclosure.

FIG. 1 illustrates a generalized embodiment of an information handling system 100, according to exemplary embodiments. For purpose of this disclosure the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system 100 can include processing resources for executing machine-executable code, such as a central processing unit (CPU), a programmable logic array (PLA), an embedded device such as a System-on-a-Chip (SoC), or other control logic hardware. The information handling system 100 can also include one or more computer-readable medium for storing machine-executable code, such as software or data. Additional components of the information handling system 100 can include one or more storage devices that can store machine-executable code, one or more communications ports for communicating with external devices, and various input and output (I/O) devices, such as a keyboard, a mouse, and a video display. The information handling system 100 can also include one or more buses operable to transmit information between the various hardware components.

The information handling system 100 can include devices or modules that embody one or more of the devices or modules described above, and operates to perform one or more of the methods described above. The information handling system 100 includes one or more processors (such as reference numerals 102 and 104), a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the information handling system 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within the information handling system 100, on a main circuit board of the information handling system 100, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
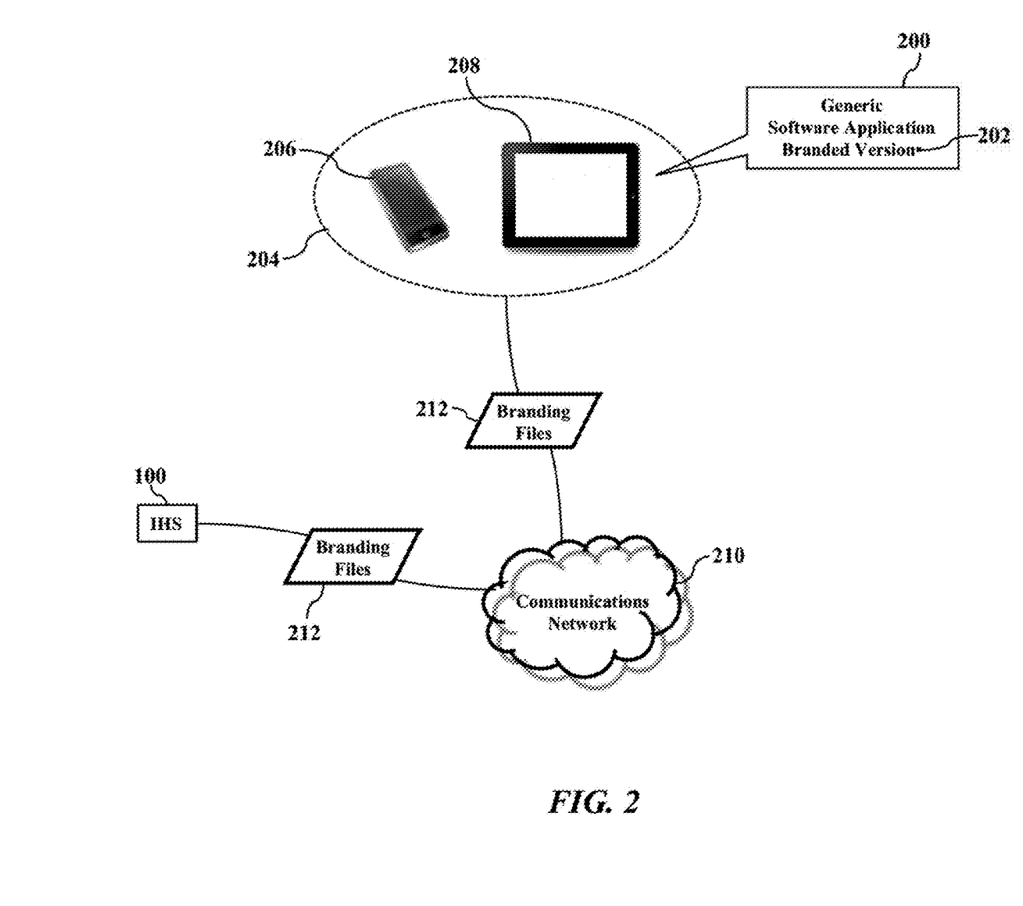
FIGS. 2-4 illustrate dynamic branding, according to exemplary embodiments.
Figure 3:
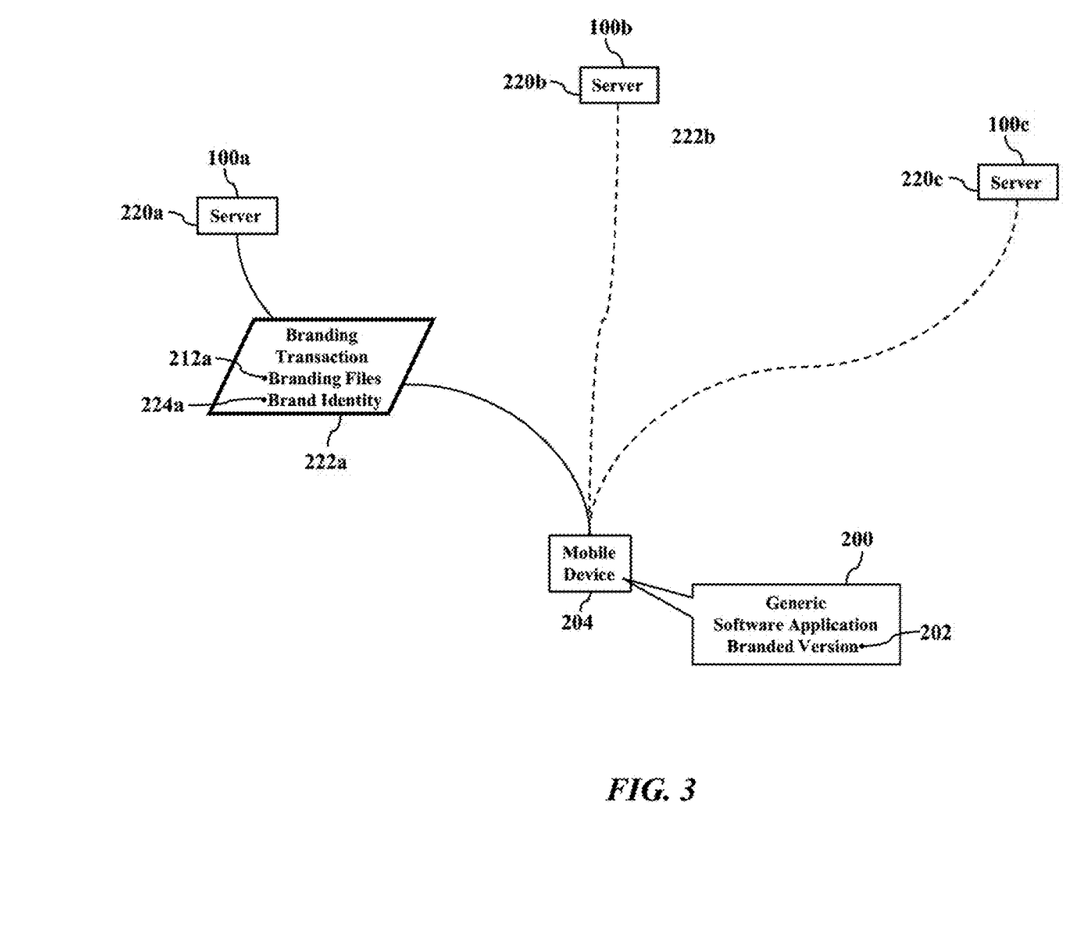
Figure 4:
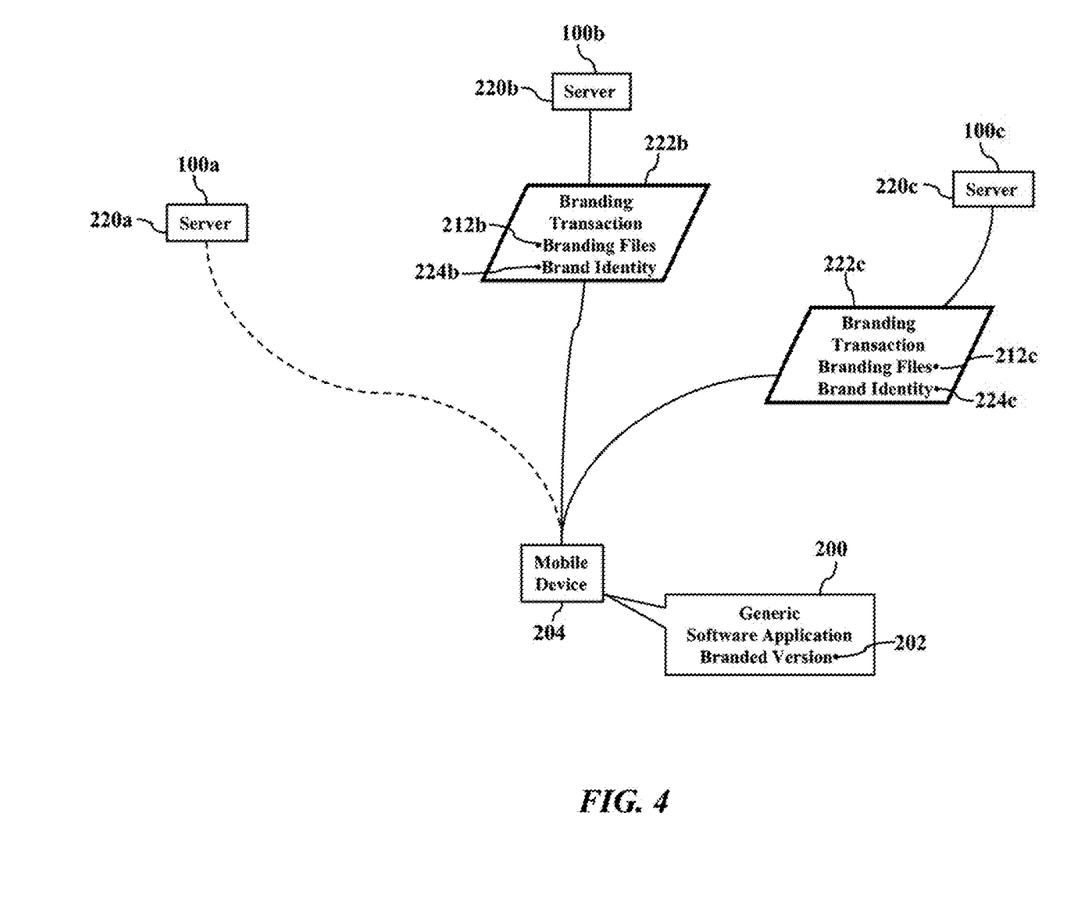

FIGS. 2-4 illustrate dynamic branding, according to exemplary embodiments. Here exemplary embodiments transform a generic software application 200 into a branded version 202 that suits or matches a manufacturer or reseller of the information handling system (IHS) 100. Suppose the generic software application 200 is stored in a mobile device 204 such as a smart cellular phone 206 or a tablet computer 208. The mobile device 204, though, may be any processor-controlled device. Regardless, when the mobile device 204 establishes wireless or wired communication with the information handling system 100 (via a communications network 210), the information handling system 100 pushes or sends separate branding files 212 to the mobile device 204. The mobile device 204 may then insert the branding files 212 into the generic software application 200, thus at least temporarily generating the branded version 202. The branded version 202, in plain words, incorporates trademarks, logos, service marks, graphics, addresses, text, and any other indicators of the particular manufacturer or the reseller associated with the branding files 212. The branded version 202 thus assumes the look and feel of the particular manufacturer's or the reseller's intellectual property.

FIG. 3 illustrates a typical scenario. Here the information handling system 100 is configured as a server 220 in a networked environment. Indeed, a typical server room or farm may have multiple servers (such as 220a-c) sourced from different resellers. That is, even though all the servers 220a-c may be manufactured by a single, common manufacturer (such as Dell®), the servers 220a-c were purchased from multiple third party resellers. When an administrator or technician uses the mobile device 204 to interface with any of the servers 220a-c, the mobile device 204 would conventionally have to store many different software applications associated with the many different third party resellers. Exemplary embodiments, though, allow the single generic software application 200 to be configured to suit any reseller's server appliance.

Each server 220a-c provides its individual branding. Suppose an administrator or technician uses the mobile device 204 to remotely manage or configure the first server 220a. When the mobile device 204 establishes communication with the first server 220a, the mobile device 204 and the first server 220a handshake and establish or engage in a first electronic branding transaction 222a. That is, the server 220a retrieves its respective branding files 212a and sends the branding files 212a to the mobile device 204. Once the mobile device 204 receives one or more of the branding files 212a, the mobile device 204 augments the generic software application 200 with the branding files 212a provided by the first server 220a. The mobile device 204 thus generates the branded version 202a that assumes a brand identity 224a associated with the first server 220a. The administrator or technician may then manage the server 220a using the branded version 202a of the generic software application 200 that incorporates brand identity 224a provided by the first server 220a. When the administrator or technician is finished managing the first server 220a, communication may terminate and the branding files 212a may be disregarded, ignored, discarded, and/or even deleted. The generic software application 200 may thus return to its debranded configuration or state, and the generic software application 200 is ready to accept a different branding assignment.

FIG. 4 illustrates subsequent branding. Here the generic software application 200 may sequentially or serially assume any brand identity 224. Once the connection or communication with the first server 220a suspends, waits, or ends, the generic software application 200 may be ready to assume another endpoint's brand. Suppose, for example, the administrator or technician uses the mobile device 204 to remotely manage the second server 220b. Once communication is established, the mobile device 204 and the second server 220b engage in the electronic branding transaction 222b. The second server 220b sends its respective branding files 212b to the mobile device 204 for incorporation into the generic software application 200. The mobile device 204 thus generates the branded version 202 that displays the brand identity 224b associated with the second server 220b. Similarly, when the mobile device 204 remotely manages the third server 220c, the third server 220b sends its respective branding files 212c for incorporation into the generic software application 200. Exemplary embodiments thus allow the generic software application 200 to dynamically adapt to any brand identity 224a-c provided by any reseller.

Exemplary embodiments are thus very useful for remote management and maintenance. Server farms may contain many information handling systems 100, perhaps even hundreds or thousands of servers 220. An administrator or technician may have to interface with many different servers 220 supplied by or sourced from many different resellers. Administrators and technicians would ordinarily have to download and install many different software applications when managing the many different server appliances. Exemplary embodiments, instead, require only downloading the single generic software application 200. Each individual server 220 may then supply its own brand identity 224 during the electronic branding transaction 222. The generic software application 200 may then transform to assume the brand identity 224 provided by the server 220.

Figure 5A:
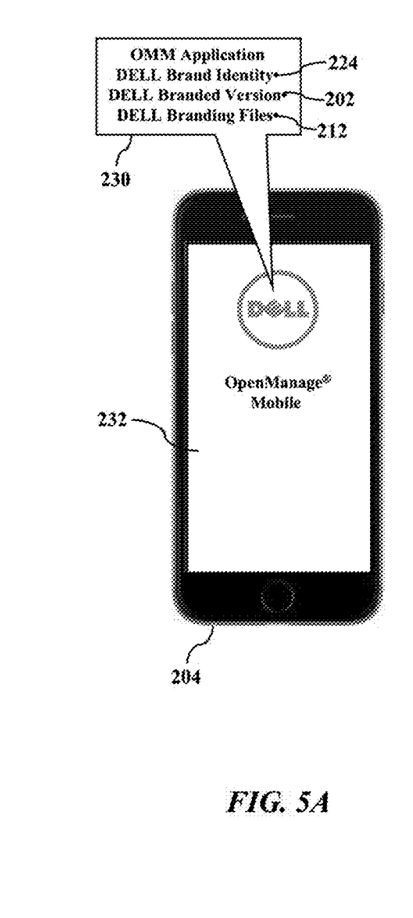
FIGS. 5A-5C illustrate the Dell® OpenManage® Mobile application, according to exemplary embodiments.
Figure 5B:
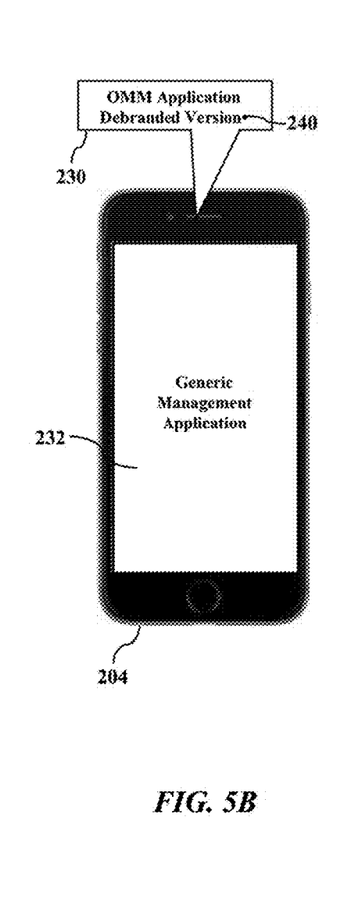
Figure 5C:
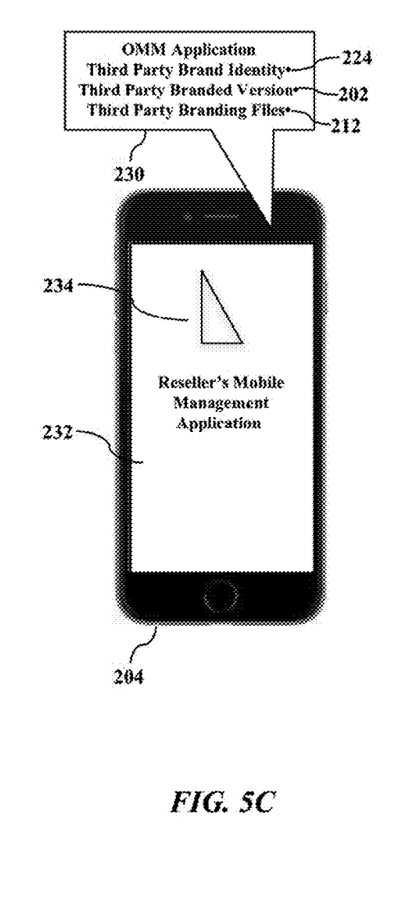

FIGS. 5A-5C illustrate the Dell® OpenManage® Mobile (OMM) application 230, according to exemplary embodiments. Here the Dell® OMNI application 230 may be debranded to dynamically assume any reseller's brand identity 224. DELL's OMNI application 230 is a systems management application for management of Dell® manufactured servers from a mobile platform (such as an Apple® IoS® or Android® device). The Dell® OMNI application 230 may be deployed and downloaded to the mobile device 204, and the OMNI application 230 instructs the mobile device 204 to generate a graphical user interface 232. The OMNI application 230 thus allows on-site personnel to use their mobile device 204 to configure and to troubleshoot the information handling system (illustrated as reference numeral 100 in FIGS. 1-4). The on-site personnel may thus inventory a server in the field via a wireless interface (such as Bluetooth®, Wi-Fi®, of near-field communications). OEM customers and resellers may thus brand the OMM application 230 to suit their individual brand identity 224.

FIG. 5A illustrates DELL® branding. Because Dell® manufactured the information handling system 100, the OMM application 230 may be offered with Dell's brand identity 224. For simplicity, FIG. 5A only illustrates the graphical user interface 232 incorporating the Dell® logo 234. The OMM application 230, however, may incorporate any more of the branding files 212 associated with Dell's brand identity 224 (e.g., graphics and addresses). So, FIG. 5A illustrates the Dell®-branded version 202 of the OMNI application 230 for any chassis marketed under the Dell® brand identity 224.

FIG. 5B, though, illustrates a generic, debranded version 240 of the OMM application 230. Here the OMNI application 230 lacks any brand identity 224. Even though Dell® may have manufactured the information handling system 100, the information handling system 100 may be offered for sale to a reseller (such as another OEM customer). Exemplary embodiments may thus remove or ignore Dell's brand identity 224 (illustrated in FIG. 5A) to produce the generic, debranded version 240 of the OMM application 230. The OMNI application 230 may thus be stripped of the Dell® logo 234 and any other branding files 212.

FIG. 5C illustrates a third party branded version 242 of the OMNI application 230. Here the mobile device 204 self-configures the OMNI application 230 to assume the brand identity 224 associated with a third party reseller. As this disclosure explains, the information handling system 100 may be offered for resale to a third party reseller. The reseller may then rebrand the server chassis, BIOS splash screen, and the graphical user interface 232 to reflect its individual third party brand identity 224. FIG. 5C thus illustrates the graphical user interface 232 displaying the third party reseller's logo 234. The OMM application 230 may also incorporate any other of the third party reseller's branding files 212 associated with the third party reseller's brand identity 224. The branding files 212 may even include or specify more customized features and functionality, as required or specified by the reseller.

Branding may thus be dynamically acquired based on the information handling system (illustrated as reference numeral 100 in FIGS. 1-4). The OMNI application 230 may be offered for download as a generic, debranded version 232 that lacks or reflects no brand identity 224. In other words, all Dell® branding may be removed from the generic version of the OMNI application 230. Model names, contact information, and any other identifying information may also be removed or genericized. Even advanced behaviors (such as thermal tables and/or white and black URL lists) may be removed or genericized. The debranded version 240 of Dell's OMM application 230 may then be posted for download. Once the debranded version 240 of Dell's OMNI application 230 is downloaded to the mobile device 204, the OMM application 230 is then ready to connect and assume any brand identity 224. Once the user of the mobile device 204 completes any management operations or functions, the brand identity 224 is deleted or rejected. The OMM application 230 thus returns to its original, debranded version 240 and awaits another brand identity 224.

Exemplary embodiments may thus utilize the standard distribution scheme for software. As the reader may understand, mobile applications are typically distributed by centralized application stores operated by vendors of mobile operating systems (e.g., Apple®, Google®, and Microsoft®). These vendors usually require that mobile applications conform to specific requirements. Delivery of custom mobile applications outside these established distribution schemes is difficult and poses security concerns. Uniquely branded versions of the OMNI application 230 are thus burdensome and perhaps unattractive. Exemplary embodiments, instead, may provide the single, generic, and debranded version 240 of the OMNI application 230 for download from the established vendors. Data fields, logos, images, and other branding opportunities may be blank or empty, thus allowing perhaps temporary replacement or configuration in response to the individual branding files 212. The debranded version 240 of the OMM application 230 may thus have an identity module that dynamically brands and customizes according to the branding files 212. The branding files 212 may thus include strings, data fields, text, logos, colors, graphics, settings, feature flags, performance behavior(s), and any other electronic content that transform the debranded version 240 of the OMM application 230 to project the particular brand identity 224. The user's mobile device 204 thus brands the OMNI application 230.

A fee structure may also be used. The debranded version 240 of the OMM application 230 may be downloaded for free or for a fee. Regardless, licensing fees may then be charged to the reseller for the branding opportunity. For example, each individual insertion may incur a fee. Each individual branding file 212 may incur a fee. The fee structure, of course, may be uniquely tailored to suit each reseller.

Figure 6:
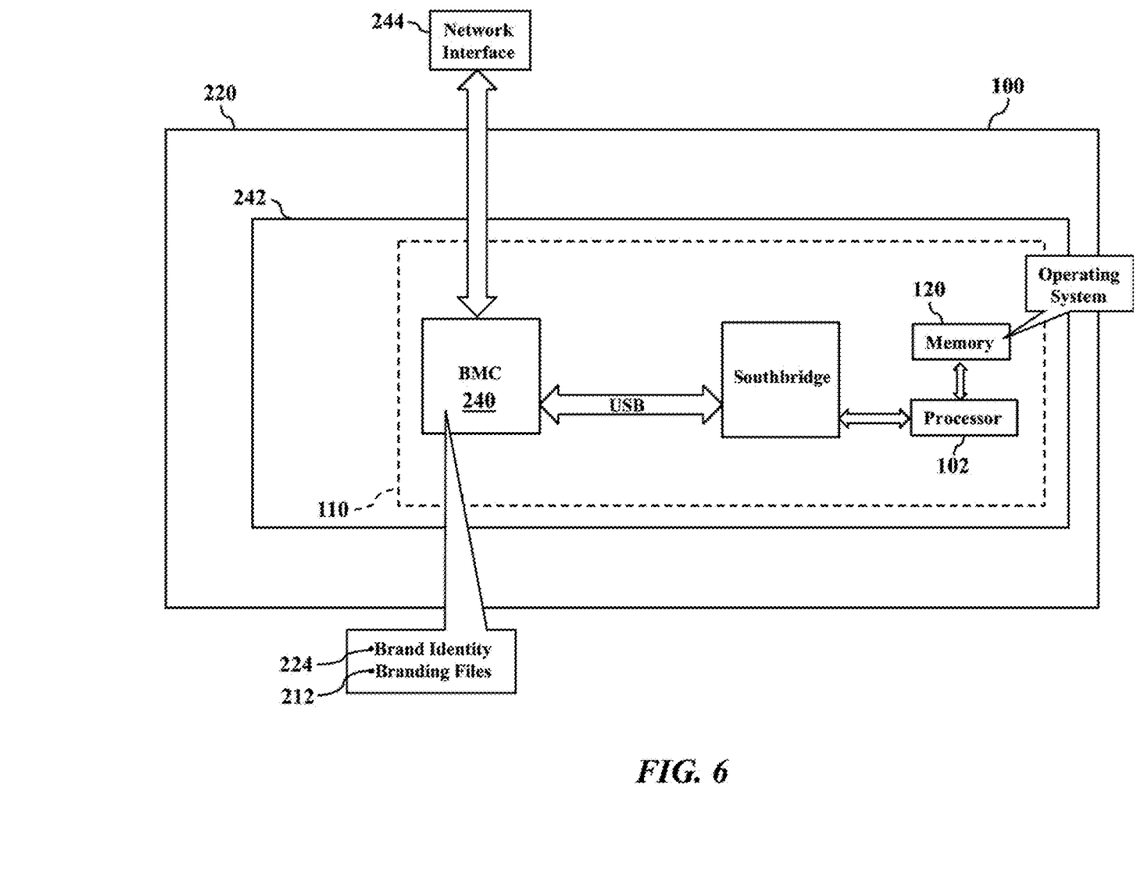
FIGS. 6-7 further illustrate dynamic branding, according to exemplary embodiments.
Figure 7:
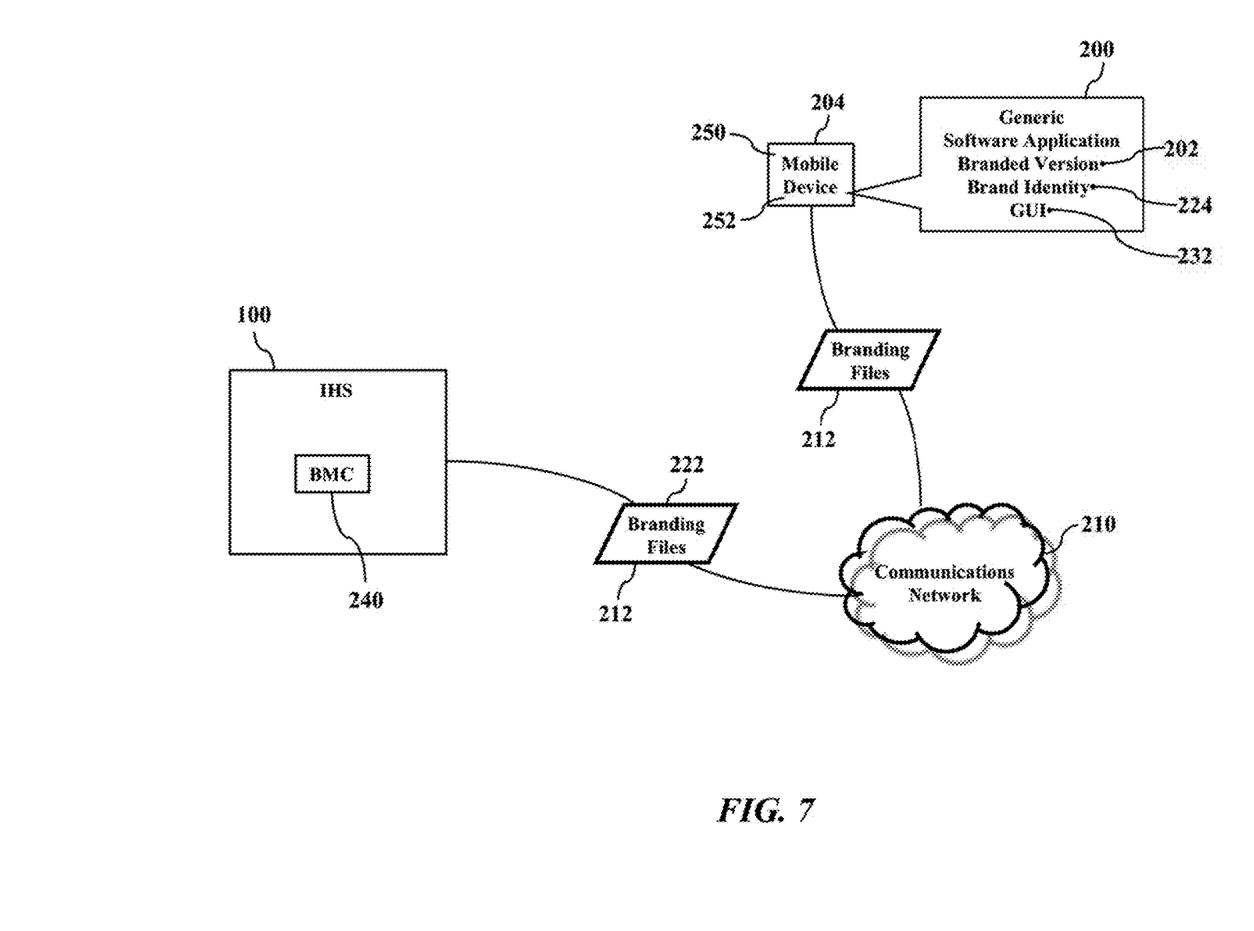

FIGS. 6-7 further illustrate dynamic branding, according to exemplary embodiments. Here a baseboard management controller (BMC) 240 may provide the brand identity 224. When the information handling system 100 is configured as the server 220, the server 220 may be remotely managed, perhaps according to the Intelligent Platform Management Interface (IPMI) specification. That is, the server 220 has a motherboard 242 comprising the chipset 110. However, the server 220 may also have the separate baseboard management controller 240. As those of ordinary skill in the art understand, the baseboard management controller 240 interfaces with the motherboard 222 to provide side-band and out-of-band remote management of the host server 220. The baseboard management controller 240 has one or more physical communications links and interfaces to the motherboard 242, thus allowing the baseboard management controller 240 to process messages according to the IPMI specification. The baseboard management controller 240 may thus monitor and report the functions and performance of the server 220 via a separate network interface 244 to the communications network 210 (illustrated in FIG. 2). The IPMI specification is generally well known and thus need not be explained in detail.

As FIG. 7 illustrates, the baseboard management controller 240 may supply the brand identity 224. The mobile device 204 may establish communication with the information handling system (IHS) 100 and/or the baseboard management controller 240 via the communications network 210. The baseboard management controller 240 may thus interface with the generic software application 200 (such as the OMNI application 230 explained with reference to FIGS. 5A-5C). The baseboard management controller 240 may then retrieve and push the branding files 212. That is, the baseboard management controller 240 and the mobile device 204 establish the electronic branding transaction 222. The baseboard management controller 240 retrieves the branding files 212 (such as from the memory device 120 illustrated in FIGS. 1 and 6) and sends the branding files 212 to an Internet Protocol address associated with the mobile device 204. Once the mobile device 204 receives one or more of the branding files 212, the mobile device 204 incorporates the branding files 212 into the generic software application 200. That is, the mobile device 204 has a processor 250 that may at least temporarily store the branding files 212 in a memory device 252. The processor 250 may also generate the graphical user interface (GUI) 232 that reflects the brand identity 224 supplied by the baseboard management controller 240. Indeed, web pages and/or text may also be generated or copied that reflects the brand identity 224. The mobile device 204 thus displays the branded version 202 that assumes the brand identity 224 associated with the baseboard management controller 240.

Figure 8:
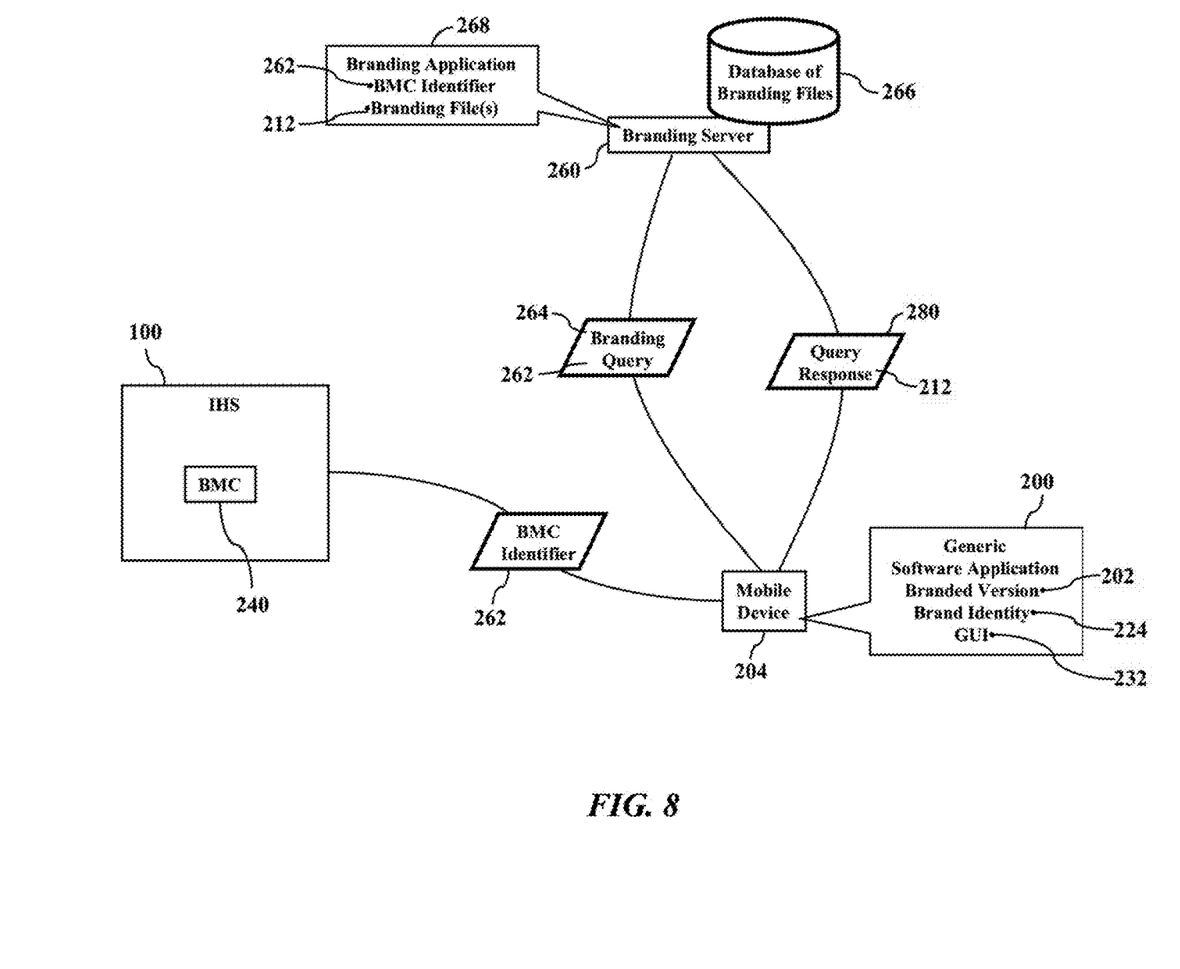
FIGS. 8-9 further illustrate branding files, according to exemplary embodiments.
Figure 9:
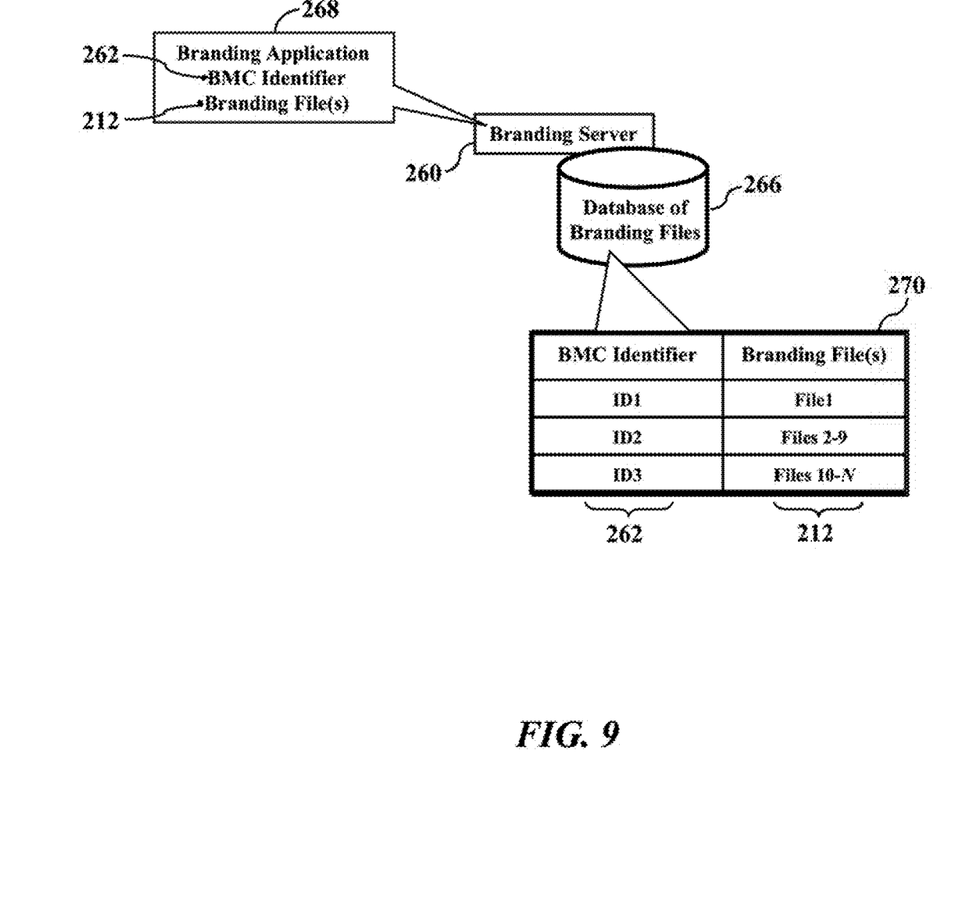

FIGS. 8-9 further illustrate the branding files 212, according to exemplary embodiments. Here the branding files 212 may be remotely retrieved from a branding server 260. When the mobile device 204 communicates with the baseboard management controller 240, here the baseboard management controller 240 may send a BMC identifier 262 (via the communications network 210 as illustrated in FIGS. 2 and 7). The BMC identifier 262 may be a serial number, Internet Protocol address, or any other alphanumeric combination or text that uniquely identifies the baseboard management controller 240 (or perhaps the network interface 244 illustrated in FIG. 6). When the mobile device 204 receives the BMC identifier 262, the generic software application 200 may instruct or cause the mobile device 204 to generate a branding query 264. The generic software application 200 instructs or causes the mobile device 204 to send the branding query 264 via the communications network 210 to a network address (e.g., IP address) associated with the branding server 260. When the branding server 260 receives the branding query 264, the branding server 260 queries an electronic database 266 of branding files. That is, the branding server 260 has one or more processors (such as the processors 1002 and 104 illustrated in FIG. 1) that execute a branding application 268 stored in a memory device (such as the memory 120 also illustrated in FIG. 1). The branding application 268 instructs or causes the branding server 260 to inspect the branding query 264 for the BMC identifier 262 specified by the baseboard management controller 240. The branding server 260 thus queries the electronic database 266 of branding files for the BMC identifier 262 and retrieves the corresponding branding files 212.

FIG. 9 illustrates electronic database operations. For simplicity, the electronic database 266 of branding files is illustrated as a table 270 that electronically maps, relates, or associates different BMC identifiers 262 to different branding files 212. The electronic database 266 of branding files may thus have database entries that associate the BMC identifier 262 to its corresponding one or more branding files 212. While FIG. 9 only illustrates a few entries, in practice the electronic database 266 of branding files may contain hundreds, thousands, or even millions of entries for a large number of BMC identifiers 262. The branding server 260 may thus query the electronic database 266 of branding files for the BMC identifier 262 and retrieve any electronically associated entries. The branding server 260 may also perform a reverse lookup in which the branding files 212 reveal the corresponding BMC identifier 262.

Referring again to FIG. 8, once the branding server 260 retrieves the branding files 212, the branding server 260 sends a query response 280. The query response 280 specifies the branding files 212 that electronically associated to the BMC identifier 262 specified in the branding query 264. The query response 280 routes via the communications network 210 to the network address (e.g., IP address) associated with the mobile device 204. That is, the branding files 212 may be included as packets of data in the query response 280. The branding files 212 may additionally or alternative be streamed to the mobile device 204 as a stream of packetized data. Regardless, as the branding files 212 are received, the generic software application 200 incorporates the branding files 212 to generate the branded version 202 that reflects the brand identity 224.

The branding files 212 may thus be retrieved online. Whether the communications network 210 is a private network or the public Internet, the branding files 212 may be remotely retrieved via an online connection. No matter where the baseboard management controller 240 is installed or located, a network connection ensures that the branding files 212 are available for reseller branding. The reseller may thus assume responsibility for downloading the branding files 212 to the baseboard management controller 240, thus relieving the chassis manufacturer of branding responsibilities.

Figure 10:
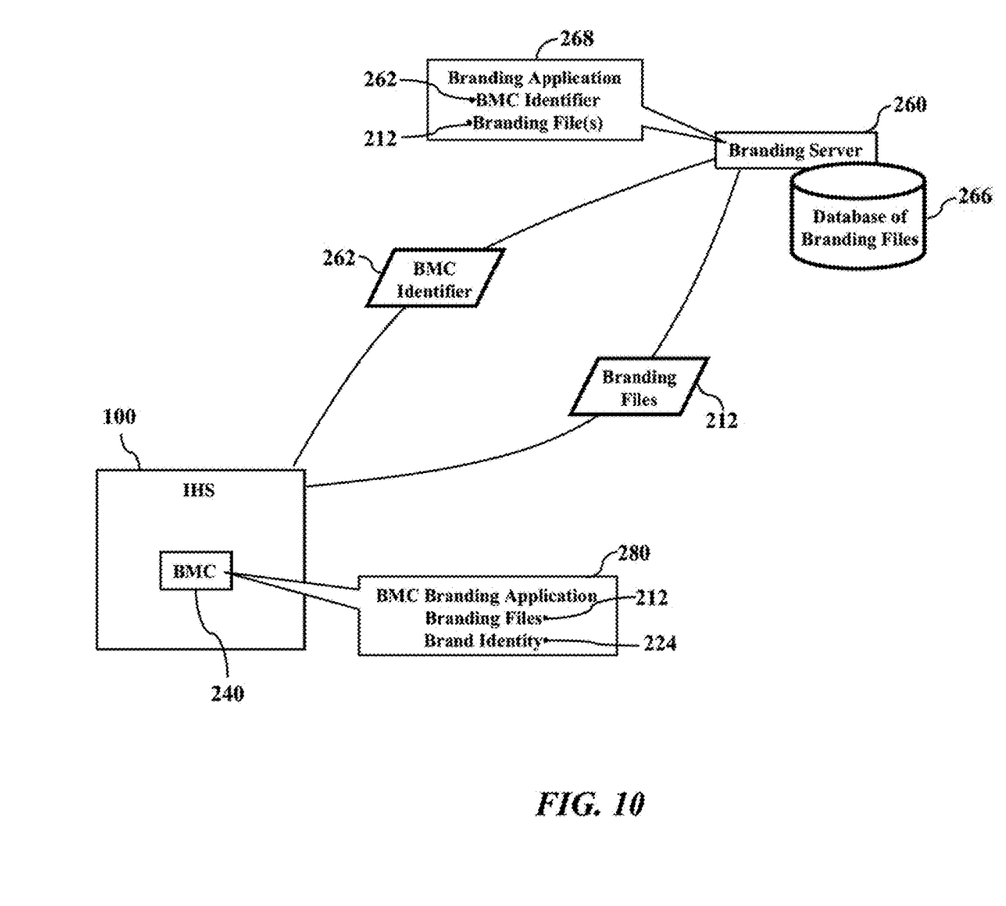
FIG. 10 illustrates online branding updates, according to exemplary embodiments.

FIG. 10 illustrates online branding updates, according to exemplary embodiments. Here the branding files 212 may be updated and periodically or randomly downloaded to the baseboard management controller 240. As FIG. 10 illustrates, the baseboard management controller 240 may execute a BMC-side branding application 280. The BMC-side branding application 280 and the branding application 268 may cooperate to ensure the branding files 212 are up-to-date and correctly reflect the particular reseller's brand identity 224. The BMC-side branding application 280 may cause the baseboard management controller 240 to query the branding server 260 for updated versions of the branding files 212. The baseboard management controller 240 sends its BMC identifier 262 as a packetized query or message to the network address associated with the branding server 260. The branding server 260 thus queries the electronic database 266 of branding files for the BMC identifier 262 and retrieves the latest versions or listing of the branding files 212. The branding server 260 sends the branding files 212 as a response to the network address (e.g., IP address) associated with the baseboard management controller 240. The baseboard management controller 240 may then locally store the latest or updated branding files 212 (such as in the memory 120 illustrated in FIG. 1). The baseboard management controller 240 is then prepared to provide or supply the branding files 212 reflecting the brand identity 224.

Figure 11:
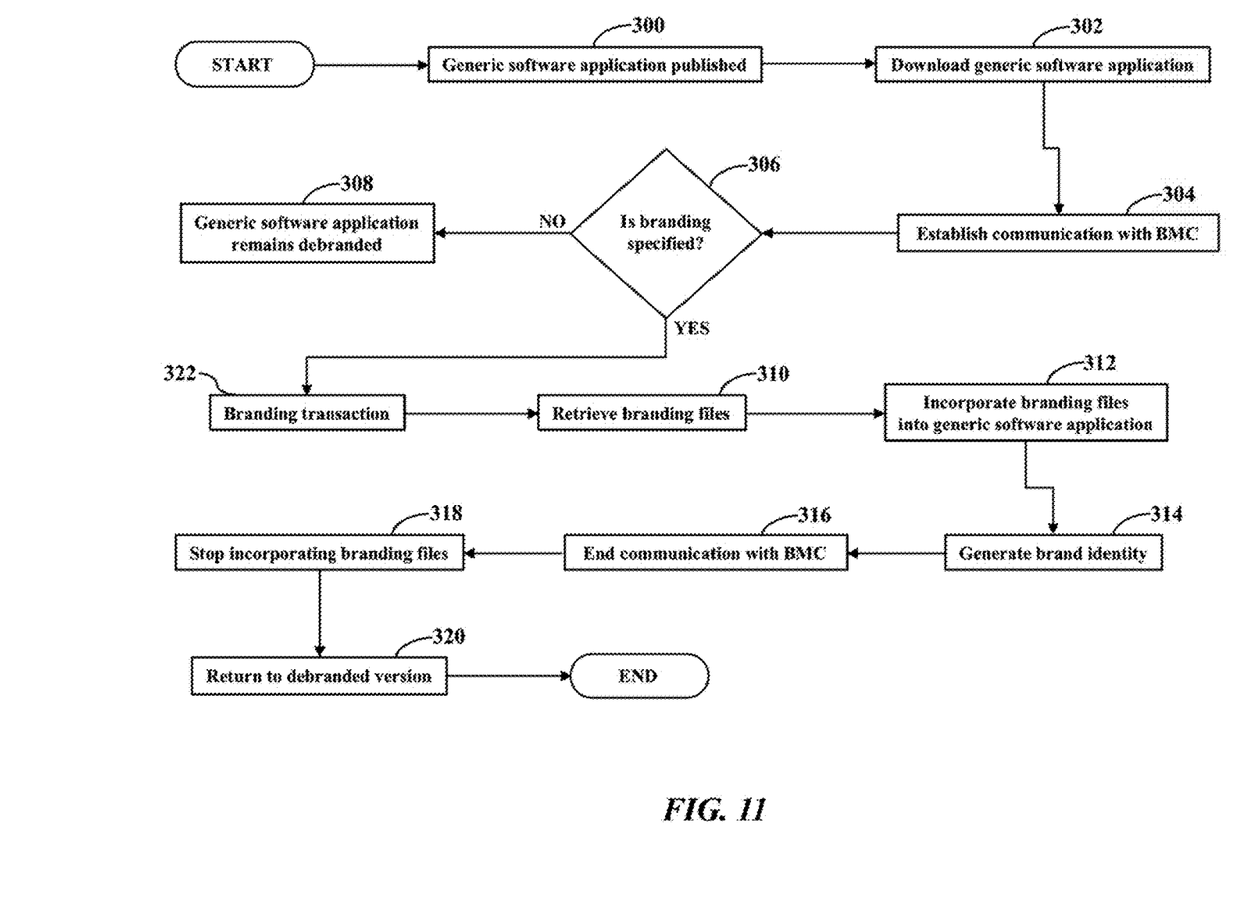
FIG. 11 illustrates a method or process for dynamic branding, according to exemplary embodiments.

FIG. 11 illustrates a method or process for dynamic branding, according to exemplary embodiments. The debranded, generic software application 200 may be published or uploaded (Block 300). The generic software application 200, for example, may be available for download from online websites (such as iTunes®, Play®, and other media application stores). The generic software application 200 is downloaded to a device (such as the mobile device 204 illustrated in FIGS. 1-5) (Block 302). When the generic software application 200 is executed, the generic software application 200 establishes communication with the baseboard management controller (BMC) 240 via the communications network 210 (Block 304). The generic software application 200, for example, may perform a handshake operation to establish protocols, commands, and other formalities. If the baseboard management controller specifies branding (Block 306), the branding transaction 222 is performed (Block 308) and the branding files 212 are retrieved (Block 310). The branding files 212 may then be incorporated into the generic software application 200 (Block 312) to generate the brand identity 224 (Block 314). Should communication with the baseboard management controller 240 cease or pause (Block 316), the branding files 212 may no longer be processed (Block 318), thus returning the generic software application 200 to its debranded version 240 (Block 320). However, if branding is not specified or not needed (Block 306), the generic software application 200 may remain in its debranded version 240 (Block 322).

Exemplary embodiments may packetize. The information handling system 100, the mobile device 204, the server 220, the baseboard management controller 240, and the branding server 260 may interface with a local area network and/or a wide area network (such as the Internet). Messages and data may be packetized into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, Wi-Fi®, near field, and/or Bluetooth® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the World Wide Web), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of dynamically branding a generic software application during a management of an information handling system, comprising:
    establishing, by a mobile device, wireless communication via a wireless network with the information handling system;
    executing, by a processor operating in the mobile device, the generic software application for the management of the information handling system, the generic software application lacking a brand identity associated with the information handling system;
    receiving, by the mobile device, an electronic logo sent from the information handling system via the wireless network;
    incorporating, by the mobile device, the electronic logo into the generic software application executed by the processor operating in the mobile device to provide the brand identity;
    terminating the wireless communication with the information handling system; and
    deleting the electronic logo from the generic software application in response to the terminating of the wireless communication with the information handling system;
    wherein the generic software application temporarily assumes the brand identity during the wireless communication with the information handling system via the wireless network.

2. The method of claim 1, further comprising conducting a branding transaction between the mobile device and the information handling system.

3. The method of claim 1, further comprising generating a graphical user interface.

4. The method of claim 3, further comprising incorporating the brand identity into the graphical user interface.

5. The method of claim 1, further comprising receiving a branding file during the wireless communication with the information handling system via the wireless network.

6. The method of claim 5, further comprising incorporating the branding file into the generic software application executed by the processor operating in the mobile device.

7. An apparatus, comprising:
    a processor; and
    a memory device accessible to the processor, the memory device storing instructions that when executed cause the processor to perform operations including:
        establishing a wireless communication via a wireless network between a baseband management controller and a mobile device;
        managing the baseband management controller via an interface provided by a generic software application, the generic software application lacking a brand identity associated with the baseband management controller;

retrieving the brand identity from the baseband management controller;

incorporating the brand identity into the interface during the wireless communication via the wireless network between the baseband management controller and the mobile device;

terminating the wireless communication via the wireless network between the baseband management controller and the mobile device; and removing the brand identity from the interface provided by the generic software application in response to the terminating of the wireless communication via the wireless network between the baseband management controller and the mobile device.

8. The apparatus of claim 7, wherein the operations further include conducting a branding transaction between the baseband management controller and the mobile device.

9. The apparatus of claim 7, wherein the operations further include generating a graphical user interface for the managing of the baseband management controller.

10. The apparatus of claim 9, wherein the operations further include incorporating the brand identity into the graphical user interface.

11. The apparatus of claim 7, wherein the operations further include receiving a branding file during the wireless communication via the wireless network between the baseband management controller and the mobile device.

12. The apparatus of claim 11, wherein the operations further include incorporating the branding file into the interface provided by the generic software application.

13. The apparatus of claim 7, wherein the operations further include debranding the generic software application in response to the terminating of the wireless communication.

14. A memory device storing instructions that when executed cause a processor to perform operations, the operations comprising:

establishing a wireless communication via a wireless network between a baseband management controller and a mobile device;

executing a generic software application by the mobile device, the generic software application lacking a brand identity associated with the baseband management controller;

receiving the brand identity sent from the baseband management controller to the mobile device during the wireless communication via the wireless network;

incorporating the brand identity into the generic software application executed by the mobile device;

terminating the wireless communication via the wireless network between the baseband management controller and the mobile device; and debranding the generic software application in response to the terminating of the wireless communication via the wireless network between the baseband management controller and the mobile device.

15. The memory device of claim 14, wherein the operations further comprise conducting a branding transaction between the baseband management controller and the mobile device.

16. The memory device of claim 14, wherein the operations further comprise receiving a branding file during the wireless communication via the wireless network between the baseband management controller and the mobile device.

17. The memory device of claim 16, wherein the operations further comprise incorporating the branding file into an interface provided by the generic software application.

18. The memory device of claim 17, wherein the operations further comprise removing the brand identity from the interface provided by the generic software application in response to the terminating of the wireless communication.

19. The memory device of claim 14, wherein the operations further comprise downloading the generic software application that lacks the brand identity associated with the baseband management controller.

* * * * *